Jan. 29, 1952 J. GAUDETTE 2,583,526
ELECTRIC SPACE HEATER
Filed March 29, 1950
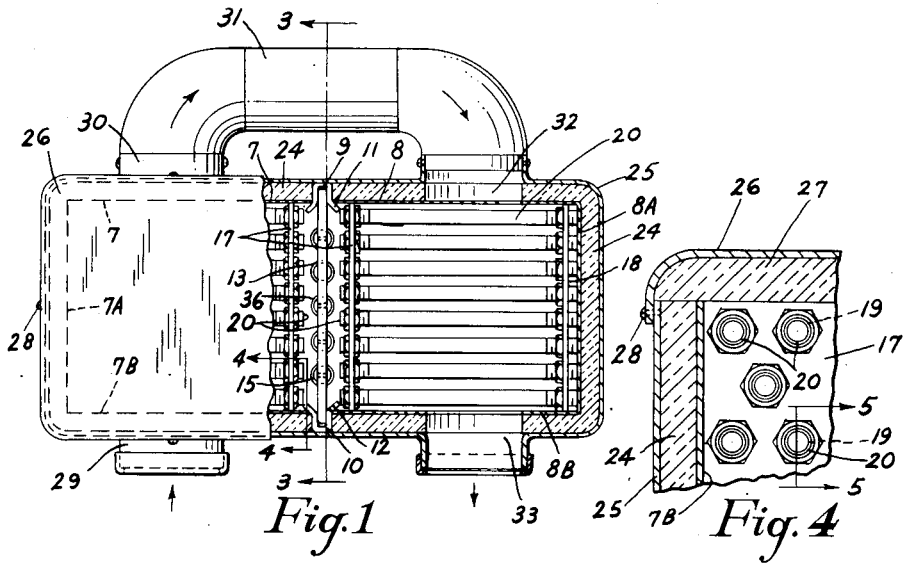
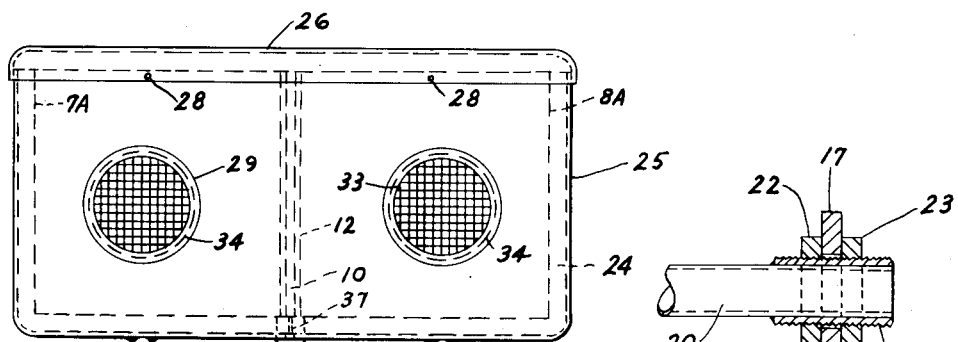
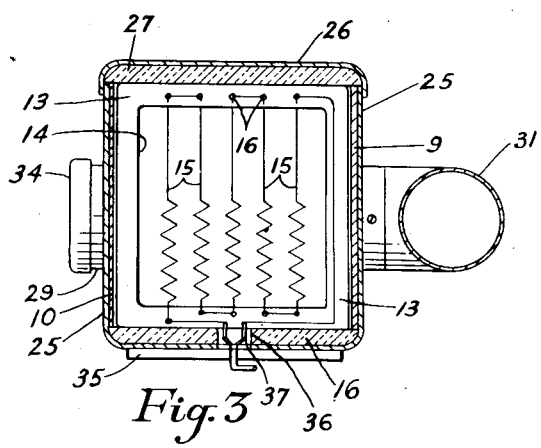
INVENTOR.
JOSEPH GAUDETTE
BY Edward M. Apple
ATTORNEY Patented Jan. 29, 1952

2,583,526

UNITED STATES PATENT OFFICE 2,583,526

ELECTRIC SPACE HEATER

Joseph Gaudette, Windsor, Ontario, Canada

Application March 29, 1950, Serial No. 152,687

8 Claims. (Cl. 219—39)

This invention relates to heaters and has particular reference to an electric space heater for domestic use.

An object of the invention is to generally improve such devices and to provide a space heater which is simple in construction, economical to manufacture, easy to assemble, and efficient in operation.

Another object of the invention is to provide a space heater which is constructed and arranged so that the air passing there-through is exposed to a maximum of heat radiating surfaces.

Another object of the invention is to provide a unit space heater which is constructed and arranged to heat the air in two stages as it passes through the device.

Another object of the invention is to provide a heater which is constructed and arranged so that the working parts are readily accessible for replacement or repair.

The foregoing and other objects and advantages of the invention will become more apparent as the description proceeds, reference being made from time to time to the accompanying drawings forming part of the within disclosure, in which drawings:

Fig. 1 is a top plan view of a device embodying the invention with parts broken away for the purpose of illustrating the position of other parts.

Fig. 2 is a side elevation of the device illustrated in Fig. 1.

Fig. 3 is a section taken substantially on the line 3—3 of Fig. 1.

Fig. 4 is an enlarged fragmentary section taken substantially on the line 4—4 of Fig. 1.

Fig. 5 is a section taken substantially on the line 5—5 of Fig. 4.

Referring now more particularly to the drawings, it will be understood that in the embodiment herein disclosed, the reference characters 7 and 8 indicate a pair of box-like members having end walls 7A and 8A and side walls 7B and 8B. The box-like members are preferably formed of any suitable material and form the inner walls of the heater. The walls 7 and 8 and the walls 7B and 8B terminate in spaced relation to each other and are held in spaced relation by means of a pair of vertical channel members 9 and 10.

The channel members 9 and 10 have outwardly flared sides 11 and 12 which serve as heat reflectors and abutments for the tubular assemblies hereinafter described. The channel members 9 and 10 also serve as retainers for the heating panel 13 which slides into the channel members 9 and 10 from the top.

The heating panel 13 is made of a suitable non-conductive and heat resisting material such as asbestos or other suitable material. The panel 13 (Fig. 3) is provided with a central cutout portion 14, across which is extended the heating element 15. The heating element 15 preferably consists of a suitable length of number 17 chrome wire, or its equivalent, which is woven back and forth through the apertures 16 formed in the upper and lower portions of the panel 13. It is within the contemplation of the invention to provide the panel 13 with heating elements of different capacities so that a greater or lesser degree of heat may be obtained.

Positioned in each box-like member is a tubular assembly which I will now describe. Each tubular assembly consists of end supports 17 and 18 which are provided with a plurality of spaced bores 19 (Fig. 4) through which extend the tubes 20. The tubes 20 terminate in spaced relation to the heating element 15 on the heating panel 13 and are adapted to be heated by the heating element 15. The tubes 20 (Fig. 5) are preferably held in the members 17 and 18 as follows:

A threaded nipple 21 is brazed or otherwise secured to the end of the tube 20, and locking nuts 22 and 23 are threaded onto the nipple 21 and are brought into closely abutting relation with the opposite faces of the members 17 and 18. This prevents the tubes from shifting longitudinally in the supports 17 and 18. The tubular assemblies are prevented from shifting longitudinally in the box-like members 7 and 8 by reason of the contacting of the ends of the tubes with the end walls 7A and 8A and with the contacting of certain of the tubes with the flared reflectors 11 and 12.

The box-like members previously described are insulated by means of a suitable insulation 24 and the whole assembly is enclosed in a housing 25 which extends around the ends, sides and bottom of the heater. A top closure member 26 having a suitable insulation 27 is positioned on top of the heater and is preferably secured to the side and end walls of the housing 25 by means of screws 28 or other suitable means.

An air intake 29 is provided in the side wall of the housing 25 and extends through the wall 7B of one of the box-like members, and a corresponding air outlet 30 is provided at the opposite side. The air outlet 30 communicates through the tubular member 31 with an air intake 32 formed in the side wall of the housing and the side wall of the box-like member 8. An air outlet 33 is formed in the opposite wall 8B and the side wall of the housing 25, so that there is a circulation of air through the device as indicated by the arrows in Fig. 1.

The air inlet 29 and the air outlet 33 are preferably protected by a wire screened cap 34, so that it would be impossible for a human being to touch the internal parts of the device when it is in operation. The heater is preferably supported on tubular legs 35 (Fig. 2). Electrical connection is made to the heating element 15 through the center of the bottom of the housing (Fig. 3) where a female outlet 36 is positioned. A corresponding male connection 37 carried in the lower end of the heating panel 13 is adapted to engage the female element 36 to make electrical connection and to permit the rapid insertion and removal of the heating panel 13.

In operation the device is assembled as hereinabove described with the proper heating panel in position. When the heating element of the heating panel 13 is energized, the heat radiating therefrom is imparted to the ends of the tubular members 20 causing the tubular members 20 to be heated throughout their entire length. Air entering the air inlet 29 is heated by coming in contact with the outer surfaces of the spaced tubular members 20 in the box 7. As the air expands, it moves through the passageway 31 to the box 8 where it is further heated by contact with the outer surfaces of the tubular members 20 in the box 8. The air is then discharged through the opening 33. An air impeller may be positioned in the passageway 31, or the movement of the air through the device may be aided by setting the device on either of its ends, in which position the lower opening will be the inlet and the upper opening will be the outlet.

Having described my invention what I claim and desire to secure by Letters Patent is:

1. In a heater of the character described in combination, a pair of box-like members each closed on all sides except one, said box-like members having their open sides arranged in spaced relation to each other, an air inlet and air outlet in each member, a heating panel in the space between said members, and a plurality of closed tubular members supported in parallel spaced relation in each member and arranged so that one end of each said tubular member is adjacent said heating element and arranged with their longitudinal axes angularly disposed to said inlet and outlet.

2. The structure defined in claim 1, including a pair of channel members positioned between said pair of box-like members and arranged to slidably support said heating panel.

3. The structure defined in claim 1, including a pair of channel members positioned between said pair of box-like members and arranged to slidably support said heating panel, said channel members having flared walls arranged to serve as reflectors.

4. The structure defined in claim 1, including a pair of channel members positioned between said pair of box-like members and arranged to slidably support said heating panel, said channel members having integrated elements arranged to serve as spacers for said pair of box-like members and end abutments for certain of the said tubular members.

5. The combination defined in claim 1, including an insulated housing for said pair of box-like members, said housing having a removable cover arranged to provide access to said heating panel.

6. The combination defined in claim 1, including an insulated housing for said box-like members, said housing having an electrical connection adjacent said heating panel.

7. The combination defined in claim 1, including an insulated housing for said box-like members, said housing having an electrical connection adjacent said heating panel, and an electrical element on said heating panel arranged to cooperate with said electrical connection on said housing.

8. The structure defined in claim 1, in which the air outlet of one box-like member is in communication with the air inlet of the other box-like member.

JOSEPH GAUDETTE.

REFERENCES CITED

The following references are of record in the file of this patent:

UNITED STATES PATENTS

| Number | Name | Date |
|---|---|---|
| 1,456,878 | Kohn | May 29, 1923 |
| 1,701,096 | Bowling et al. | Feb. 5, 1929 |
| 1,705,812 | Fisher | Mar. 19, 1929 |
| 1,749,039 | Lincecum | Mar. 4, 1930 |
| 2,119,161 | Hay | May 31, 1938 |